United States Patent
Merks et al.

(10) Patent No.: US 9,509,854 B2
(45) Date of Patent: Nov. 29, 2016

(54) ECHO CANCELLATION

(75) Inventors: Ivo Leon Diane Marie Merks, Maastricht (NL); Cornelis Pieter Janse, Eindhoven (NL); Rene Martinus Maria Derkx, Endhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1378 days.

(21) Appl. No.: 11/576,915

(22) PCT Filed: Oct. 13, 2005

(86) PCT No.: PCT/IB2005/053365
§ 371 (c)(1),
(2), (4) Date: Apr. 9, 2007

(87) PCT Pub. No.: WO2006/040734
PCT Pub. Date: Apr. 20, 2006

(65) Prior Publication Data
US 2008/0085009 A1    Apr. 10, 2008

(30) Foreign Application Priority Data
Oct. 13, 2004  (EP) .................................. 04105007

(51) Int. Cl.
H04B 3/20    (2006.01)
H04M 9/08    (2006.01)
(Continued)

(52) U.S. Cl.
CPC .... H04M 9/082 (2013.01); *G10L 2021/02082* (2013.01); *H04B 3/23* (2013.01); *H04R 3/002* (2013.01)

(58) Field of Classification Search
CPC ........ H04R 3/00; H04R 3/002; H04R 3/005; H04R 3/02; H04M 9/082; H04B 3/20; H04B 3/323–3/3238

USPC .................................. 381/66, 93, 94.1, 94.3; 379/406.01–406.03, 406.05–406.08; 370/286, 289, 290, 291; 455/570
See application file for complete search history.

(56) References Cited

U.S. PATENT DOCUMENTS 4,582,963 A * 4/1986 Danstrom ................ 379/406.08
5,631,899 A * 5/1997 Duttweiler .................... 370/291
(Continued)

FOREIGN PATENT DOCUMENTS

| | | |
|---|---|---|
| JP | S6362420 A | 3/1998 |
| WO | 9931866 | 6/1999 |

(Continued)

OTHER PUBLICATIONS

Ephraim et al: "Speech Enhancement Using a Minimum Mean-Square Error Log-Spectral Amplitude Estimator"; IEEE Trans. Acoustics, Speech and Signal Processing, vol. 33, No. 2, pp. 443-445, Apr. 1985.

(Continued)

*Primary Examiner* — Xu Mei

(57) ABSTRACT

An echo cancellation device including a first adaptive filter for producing a first echo cancellation signal, a second adaptive filter for producing a second echo cancellation signal, and a post-processor for suppressing any remaining echo. The first adaptive filter and the second adaptive filter are designed for canceling a first part of the echo impulse response and a second part of the echo impulse response respectively. The device may be utilized in a mobile telephone.

19 Claims, 5 Drawing Sheets

Figure 1:
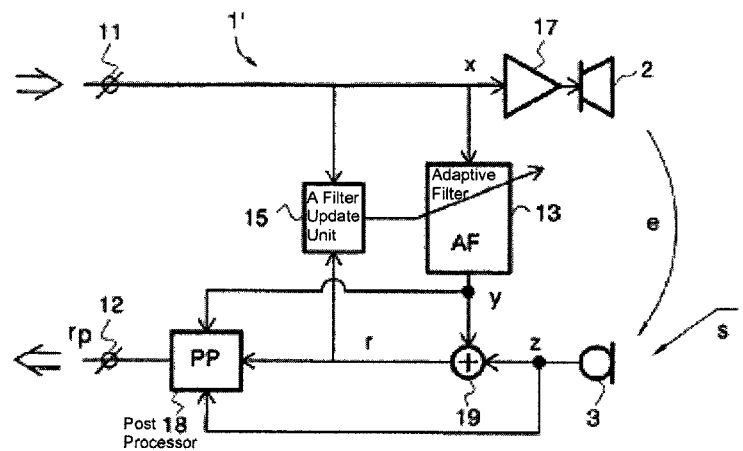

(51) Int. Cl.
*H04R 3/00* (2006.01)
*H04B 3/23* (2006.01)
*G10L 21/0208* (2013.01)

(56) References Cited

U.S. PATENT DOCUMENTS

| | | | |
|---|---|---|---|
| 5,687,229 | A | 11/1997 | Sih |
| 5,937,060 | A | 8/1999 | Oh |
| 6,097,971 | A * | 8/2000 | Hosoi ............................ 455/570 |
| 6,301,357 | B1 | 10/2001 | Romesburg |
| 6,442,275 | B1 | 8/2002 | Diethorn |
| 6,526,140 | B1 | 2/2003 | Marchok et al. |
| 6,546,099 | B2 | 4/2003 | Janse |
| 6,597,787 | B1 | 7/2003 | Lindgren et al. |
| 7,058,185 | B1 * | 6/2006 | Egelmeers et al. .............. 381/93 |
| 7,146,012 | B1 | 12/2006 | Belt et al. |
| 2002/0159585 | A1 | 10/2002 | Janse |
| 2003/0026417 | A1 * | 2/2003 | Belt et al. ................. 379/387.01 |
| 2003/0031315 | A1 | 2/2003 | Belt et al. |
| 2003/0123674 | A1 | 7/2003 | Boland |
| 2004/0264610 | A1 * | 12/2004 | Marro et al. ................... 375/347 |
| 2005/0008143 | A1 * | 1/2005 | Lang et al. ................. 379/406.1 |
| 2005/0175129 | A1 * | 8/2005 | Roovers et al. .............. 375/350 |
| 2005/0249347 | A1 * | 11/2005 | Derkx et al. ............. 379/406.06 |

FOREIGN PATENT DOCUMENTS

| | | |
|---|---|---|
| WO | 0016497 A1 | 3/2000 |
| WO | 0025441 A1 | 5/2000 |
| WO | 0203563 A1 | 1/2002 |
| WO | 03010950 A1 | 2/2003 |
| WO | 03053033 A1 | 6/2003 |
| WO | 200408731 A1 | 1/2004 |
| WO | 2005057804 A1 | 6/2005 |

OTHER PUBLICATIONS

Ephraim et al: "Speech Enhancement Using a Minimum Mean-Square Error Short-Time Spectral Amplitude Estimator"; IEEE Transactions on Acoustics, Speech, and Signal Processing, vol. ASSP-32, No. 6, Dec. 1984, pp. 1109-1121.

Merks et al: "Dynamic Echo and Noise Suppression Based on Minimum-Mean Square Error"; Koninklijke Philips Electronics N.V. 2002, Nat. Lab Technical Note 2002/019, 48 Page Document.

Merks: "A Non-Linear Acoustic Echo Canceller for PCC'S Xenium GSM"; Koninklijke Philips Electronics N.V., Nat. Lab Technical Note 2000/501, Dec. 2000, 28 page Document.

* cited by examiner

ECHO CANCELLATION

The present invention relates to residual echo cancellation. More in particular, the present invention relates to a device for and a method of canceling an echo in a microphone signal in response to a far-end signal.

Echo cancellation is utilized in hands-free telephones and other apparatus that both reproduce and receive sound. A far-end signal reproduced by the apparatus is received by its microphone and causes an echo sound. An echo cancellation device typically includes a filter unit which filters the far-end signal so as to produce an echo cancellation signal. The filter unit, typically an adaptive filter having variable filter coefficients, models the acoustic path between the reproducing transducer (loudspeaker) and the receiving transducer (microphone). In fact, a typical adaptive filter estimates the impulse response of the acoustic path and determines the convolution of the estimated impulse response and the far-end signal to produce the echo cancellation signal. This echo cancellation signal is then subtracted from the received microphone signal and the resulting residual signal is ideally equal to the near-end signal.

In practice, however, the filter unit never models the acoustic path perfectly and even the best adaptive filters are not capable of immediately adapting their filter coefficients to changing circumstances. For this reason, post-processors are often used to further process the residual signal in order to suppress any remaining echoes. An example of a post-processor is disclosed in U.S. Pat. No. 6,546,099 (Janse/Philips), the entire contents of which are herewith incorporated in this document. However, even post-processors often fail to completely remove all echoes from the microphone signal without distorting the near-end signal.

It is an object of the present invention to overcome these and other problems of the Prior Art and to provide an echo cancellation device and method which provide an improved echo cancellation.

Accordingly, the present invention provides an echo cancellation device for canceling an echo in a microphone signal in response to a far-end signal, the device comprising:
- a first adaptive filter section for filtering the far-end signal so as to produce a first echo cancellation signal,
- a second adaptive filter section for filtering a delayed far-end signal so as to produce a second echo cancellation signal,
- at least one combination unit for combining an echo cancellation signal with the microphone signal so as to produce a residual signal, and
- a post-processor for substantially removing any remaining echoes from the residual signal, wherein the post-processor is arranged for utilizing both the first and the second echo cancellation signal.

By providing a first and a second filter section for filtering the far-end signal and a delayed version of the far-end signal respectively, an increased effective filter length is achieved. While a first part of the impulse response is modeled by the first filter section, a second part is modeled by the second filter section. The first and second filter sections combined thus provide a longer impulse response model and hence a better suppression of echoes in the microphone signal than would be achieved by a single filter section.

In addition, the two filter sections are capable of modeling two distinct parts of the impulse response: the direct part and the diffuse part. The present inventors have realized that the direct part and the diffuse part of the impulse response underlying an echo signal have different characteristics and should therefore result in different filter coefficient updates and different estimates of the respective parts of the impulse response, which in turn produce distinct echo cancellation signals. In accordance with the present invention, the post-processor utilizes these distinct echo cancellation signals to provide an improved echo suppression.

The echo suppression of the post-processor may be further improved by also utilizing the microphone signal. This microphone signal may be fed directly to the post-processor, or may be derived from the echo cancellation signals and one or more residual signals.

In a first embodiment, the filter sections each constitute a filter unit having an individual associated filter update unit, and a delay unit is provided for delaying the far-end signal so as to provide the delayed far-end signal. The delay introduced by the delay unit causes the second filter section to process a different part of the impulse response from the first filter section. A range of delay times can be chosen, but it is preferred that the delay unit is arranged for providing a delay substantially corresponding to the filter length of the first filter section. By providing a delay that is approximately equal to the filter length, the two filter sections operate on substantially contiguous, non-overlapping parts of the impulse response, thus doubling the effective filter length if the two filters have equal lengths. It is particularly preferred that both the delay and the length of the first filter section substantially correspond with the direct part of the impulse response. This allows the part of the signal covered by the second filter unit to (at least partially) correspond with the diffuse part of the impulse response. By providing a separate filter coefficient update unit for each adaptive filter, each update unit and its respective filter coefficients can be matched to the characteristics of the associated part of the impulse response.

In this first embodiment, it is further preferred that the post-processor is arranged for utilizing both a first residual signal produced by a first combination unit and a second residual signal produced by a second combination unit, each combination unit preferably being coupled to a respective filter unit. That is, at least two combination units are provided for combining the respective echo cancellation signals with another signal (the microphone signal or a residual signal), and the residual signals produced by these combination units may all be used by the post-processor for echo suppression. By using additional signals, such as all residual signals, the echo suppression of the post-processor may be further improved.

In a second embodiment, the filter sections together constitute a single adaptive filter unit arranged for producing a combined echo cancellation signal comprising a combination of the first and the second echo cancellation signal.

In this embodiment, a combined echo cancellation signal is produced by the (single) adaptive filter that comprises both the first and the second filter section. These filter sections are preferably concatenated such that the first filter section introduces a delay for the second filter section. The individual echo cancellation signals of the respective filter sections are combined to form a single echo cancellation signal for combining with the microphone signal, but are also available separately for use by the post-processor. In this way, the advantages of having two distinct echo cancellation signals are maintained while using a single filter unit.

Advantageously, the device of the present invention may further comprise a tail estimation unit for estimating the echo tail, the post-processor being arranged for utilizing the estimated echo tail. The echo tail is understood to mean the part of the echo signal that cannot be compensated by the first or second filter section, due to the finite filter lengths.

Various types of post-processors may be used. It is, however, preferred that the post-processor is arranged for spectral subtraction. That is, the post-processor subtracts frequency spectra, in particular the absolute values of frequency spectra, to remove any remaining echoes in the residual signal. Accordingly, it is advantageous if the post-processor is arranged for determining the spectrum of a residual signal.

The spectral subtraction of the post-processor may involve over-subtraction factors. These are factors the (absolute values) of the frequency spectra are multiplied with prior to the spectral subtraction. In this way, the spectra can be weighted. The over-subtraction factors are typically slightly greater than one.

The present invention further provides an apparatus comprising an echo cancellation device as defined above. Such apparatus may, by way of non-limiting example, be constituted by a mobile (cellular) telephone apparatus, a land-line telephone apparatus, or a delegate terminal for a conference system.

The present invention also provides a method of canceling an echo in a microphone signal in response to a far-end signal, the method comprising the steps of:
 filtering the far-end signal so as to produce a first echo cancellation signal,
 filtering a delayed far-end signal so as to produce a second echo cancellation signal,
 combining an echo cancellation signal with the microphone signal so as to produce a residual signal, and
 post-processing the residual signal so as to substantially remove any remaining echoes,
wherein the step of post-processing involves utilizing both the first and the second echo cancellation signal. Further embodiments of the method of the present invention will become apparent from the description of the invention.

The present invention additionally provides a computer program product for carrying out the method as defined above. A computer program product may comprise a data carrier, such as a CD or DVD, on which a computer program is recorded. The computer program consists of a plurality of program steps which may be carried out by a generic computer or a special purpose computer.

The present invention will further be explained below with reference to exemplary embodiments illustrated in the accompanying drawings, in which:

FIG. 1 schematically shows an echo cancellation device according to the Prior Art.

Figure 2:
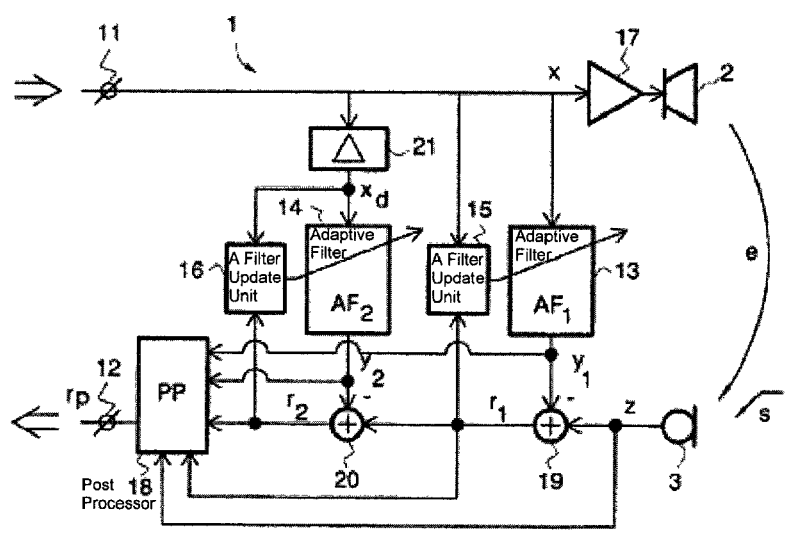

FIG. 2 schematically shows a first embodiment of an echo cancellation device according to the present invention.

Figure 3:
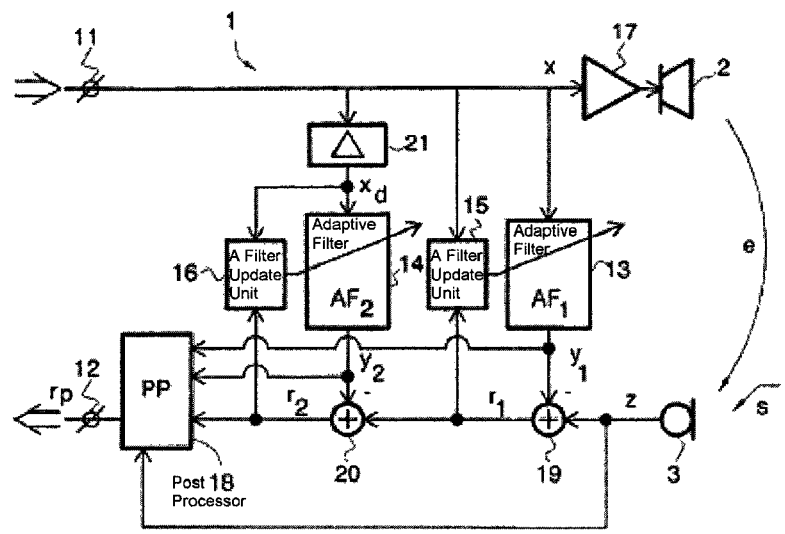

FIG. 3 schematically shows a second embodiment of an echo cancellation device according to the present invention.

Figure 4:
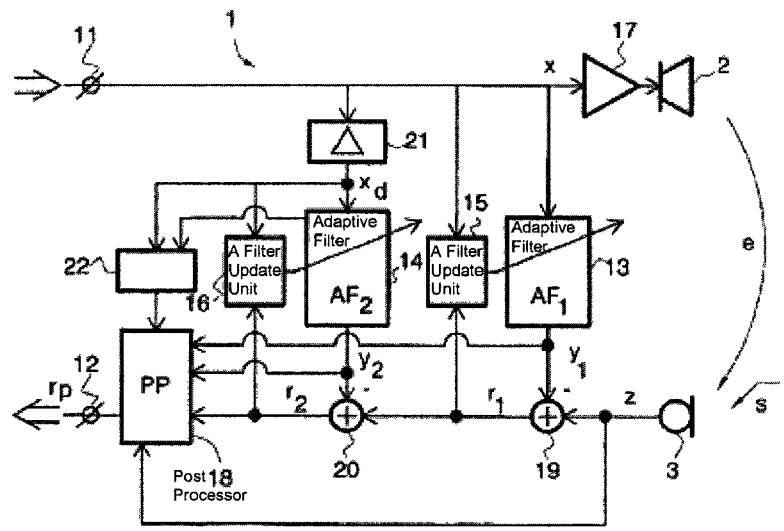

FIG. 4 schematically shows a third embodiment of an echo cancellation device according to the present invention.

Figure 5:
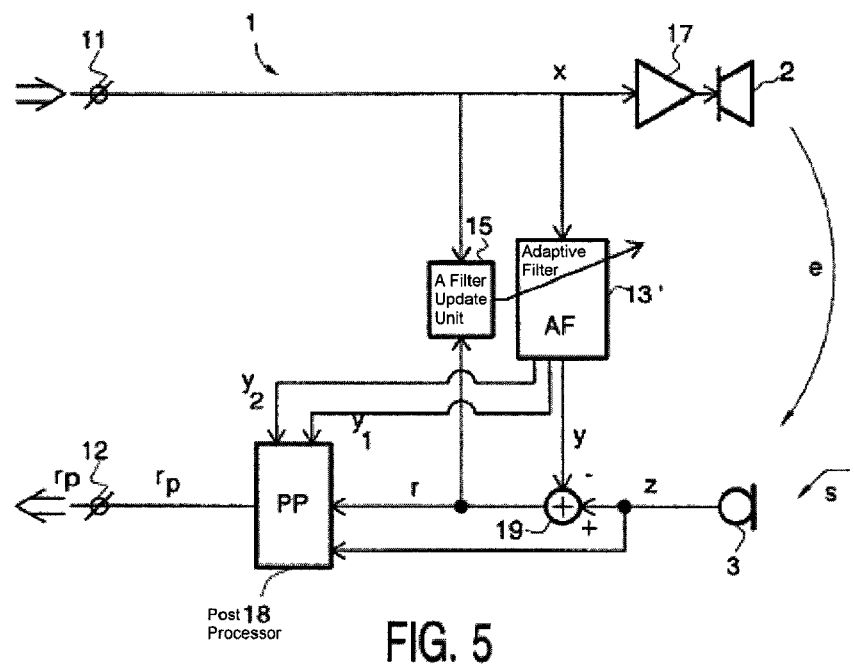

FIG. 5 schematically shows a fourth embodiment of an echo cancellation device according to the present invention.

Figure 6:
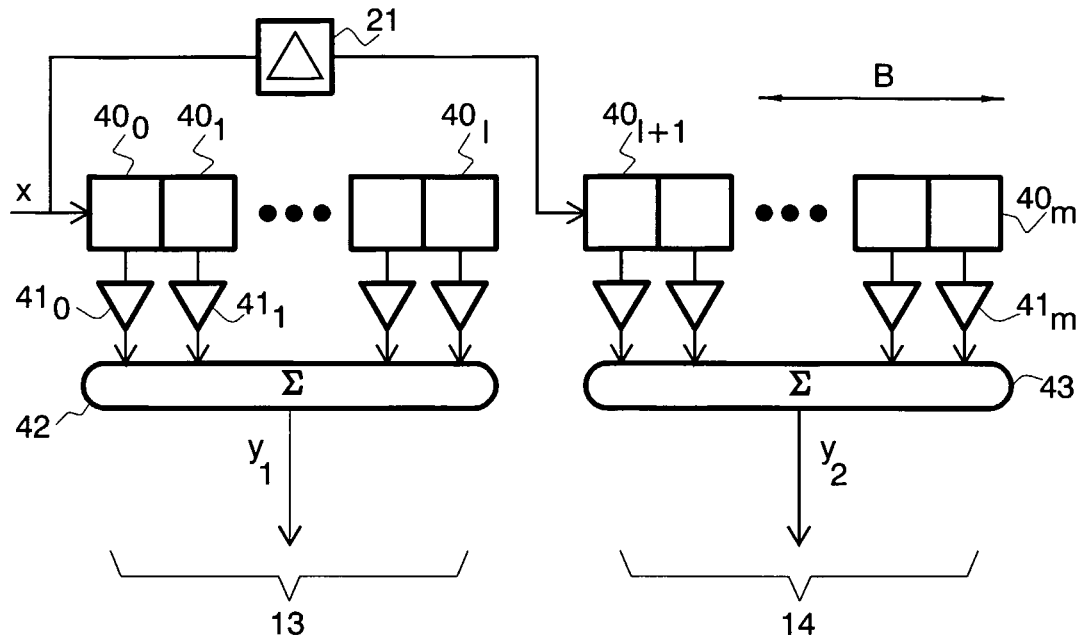

FIG. 6 schematically shows a first arrangement of filter sections according to the present invention.

Figure 7:
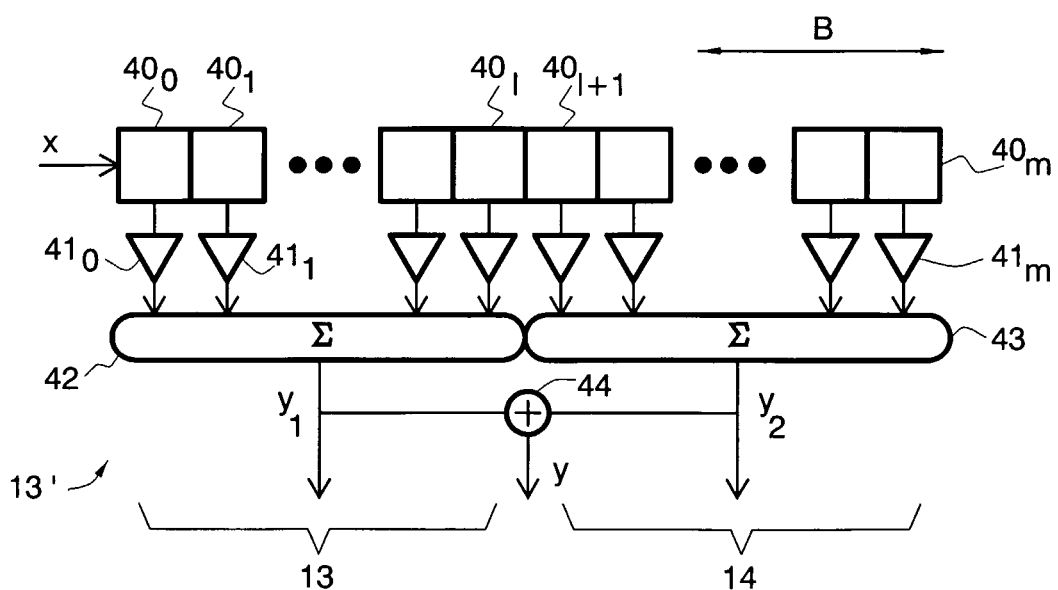

FIG. 7 schematically shows a second arrangement of filter sections according to the present invention.

Figure 8:
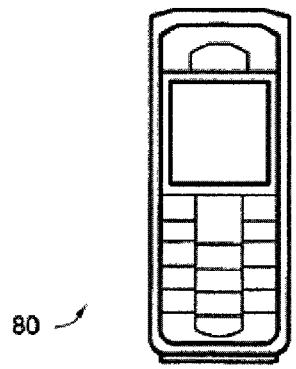

FIG. 8 schematically shows a mobile (cellular) telephone apparatus which incorporates a device according to the present invention.

Figure 9:
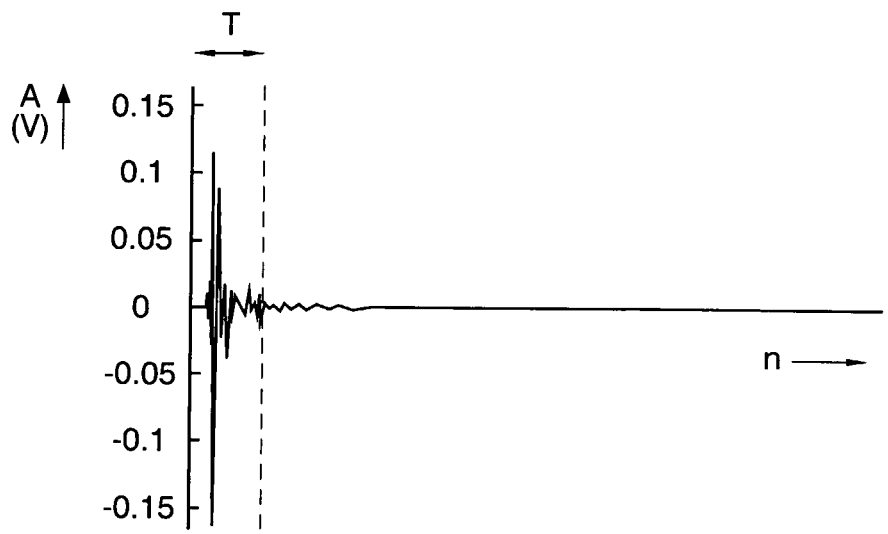

FIG. 9 schematically shows a typical impulse response of a mobile (cellular) telephone.

Figure 10:
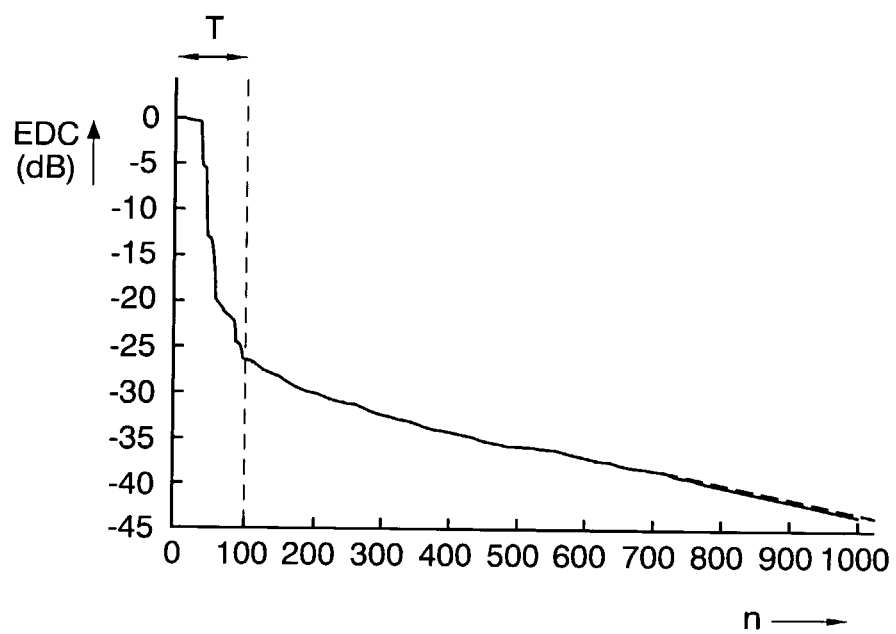

FIG. 10 schematically shows the energy decay curve corresponding with the impulse response of FIG. 9.

The echo canceling device 1' according to the Prior Art as shown in FIG. 1 comprises an input terminal 11 for receiving a far-end signal x, an output terminal 12 for supplying a (processed) residual signal $r_p$, an adaptive filter (AF) 13, a filter update unit 15, an (optional) amplifier 17, a post-processor 18 and a combination unit 19. The amplifier 17 is coupled to a first transducer (loudspeaker) 2 while the combination unit 19 is coupled to a second transducer (microphone) 3.

The loudspeaker 2 reproduces the far-end signal x that has been amplified by the amplifier 17. This reproduced far-end signal appears as an echo e at the microphone 3, together with the near-end signal s. The echo cancellation device 1' attempts to remove the echo e from the microphone signal z.

The microphone signal z is combined with an echo cancellation signal y produced by the adaptive filter. The combination unit 19 is typically constituted by an adder having a negative or inverting input (−) to which the echo cancellation signal y is fed, resulting in a subtraction of said signal. The residual signal r produced by the combination unit 19 is therefore the difference signal of the echo cancellation signal y and the microphone signal z: r=z−y.

The filter update unit 15 typically determines the correlation of the far-end signal x and the residual signal r and controls the (coefficients of the) adaptive filter 13 in such a way that this correlation is minimized. It can be seen from FIG. 1 that the echo cancellation signal y is based upon the far-end signal x. This will later be explained in more detail with reference to FIG. 6.

A post-processor (PP) 18 processes the residual signal r so as to remove remaining echo components and produces the processed residual signal $r_p$. The echo cancellation signal y and the microphone signal z are fed to the post-processor 18 as auxiliary signals.

An echo canceling device of this type is disclosed in United States Patent Application US 2003/0031315 (Belt et al./Philips), the entire contents of which are herewith incorporated in this document.

Although the echo canceling device of FIG. 1 generally works well, there are cases in which it does not work satisfactorily and the near-end signal is distorted. An example is a (mobile) telephone operating in "hands-free" mode, where the echo signal e produced by the loudspeaker 2 in response to the far-end signal x is much greater than the near-end (e.g. speech) signal s produced by a user of the telephone. Neither the adaptive filter 13 nor the post-processor 18 is capable of removing such an echo signal without introducing signal distortion. The present invention seeks to solve this problem.

The echo canceling device 1 according to the present invention shown merely by way of non-limiting example in FIG. 2 comprises an input terminal 11, an output terminal 12, a first adaptive filter 13, a second adaptive filter 14, a first filter update unit 15, a second filter update unit 16, an (optional) amplifier 17, a post-processor 18, a first combination unit 19, a second combination unit 20, and a delay unit 21. It will be understood that in digital embodiments, the device 1 will further comprise suitable A/D (analog/digital) and D/A (digital/analog) converters which are not shown for the sake of clarity of the illustration.

The first adaptive filter 13 produces a first echo cancellation signal $y_1$ which is combined with the microphone signal z in the first combination unit 19 to produce a first residual signal $r_1$. Similarly, the second adaptive filter 14 produces a second echo cancellation signal $y_2$ which the second combination unit 20 combines with the first residual signal $r_1$ to produce a second residual signal $r_2$. The post-processor 18 receives this second residual signal $r_2$ and the echo cancellation signals $y_1$ and $y_2$ to produce a processed residual signal $r_p$ from which the echoes are substantially completely removed.

In accordance with the present invention, the second adaptive filter 14 operates on the delayed far-end signal $x_d$ produced by the delay unit 21, while the first adaptive filter 13 operates on the original far-end signal x. As a result, the first adaptive filter 13 cancels the echoes corresponding with the first part of the impulse response underlying the echo signal, while the second adaptive filter 14 cancels the echoes of a second, further part of the impulse response. This will be further explained with reference to FIGS. 9 and 10.

FIG. 9 shows an exemplary impulse response of a mobile (cellular) telephone in "hands-free" mode, while FIG. 10 shows the Energy Decay Curve (EDC) of the same signal. It will be clear to those skilled in the art that the impulse response is the signal received by the microphone (3 in FIG. 2) when a Dirac (or "spike") signal is produced by the loudspeaker (2 in FIG. 2) and that the impulse response represents the acoustic behavior of the device and its surroundings.

The EDC is a measure of the remaining energy of the signal and may be expressed mathematically as $$EDC(i) = 10\log\sum_{m=i}^{\infty} h_m^2 \qquad (1)$$

where $h_m$ is the amplitude of the $m^{th}$ signal sample. In FIG. 10, the EDC of the signal of FIG. 9 is shown as a function of time, the moment in time being indicated by the sample number (n).

The amplitude A of the signal of FIG. 9 is initially zero. After a short period, in the example shown corresponding with approximately 20 samples (the time is indicated by the sample number n), the direct part of the signal arrives at the microphone. This causes a sharp drop in the EDC curve as the remaining energy of the signal rapidly decreases. After a time T, in the present example corresponding with 100 samples, the diffuse reverberations part of the signal begins. This is evidenced in FIG. 10, where the EDC between n=100 and n=800 is approximately a straight line, the slope of which is related to the reverberation time (often referred to as "T60") of the room in which the device is located. As the EDC is a logarithmic measure, expressed in deciBel (dB), the impulse response signal of FIG. 9 decays exponentially from t=T (that is, from n=100).

The present inventors have realized that the direct part (from t=0 to t=T) and the diffuse part (from t=T) of the impulse response have different properties. The echo signal, which can be described as the convolution of the impulse response and the (amplified) far-end signal, should therefore be canceled using two (or more) echo cancellation signals based upon different parts of the impulse response. The operation of the post-processor may be significantly improved by using these different echo cancellation signals.

Returning to FIG. 2, it can be seen that the filter lengths of the filters 13 and 14, and the delay of the delay unit 21 are preferably chosen such that the first filter 13 produces an echo cancellation signal $y_1$ that corresponds with the first, direct part of the impulse response (from t=0 to t=T) while the second filter 14 produces an echo cancellation signal $y_2$ that corresponds with the second, diffuse part of the impulse response (from t=T). This may be accomplished, in the example shown, by both a filter length and a delay equal to 100 samples. This will cause the first echo cancellation signal $y_1$ to substantially completely cancel the impulse response during the first 100 samples, after which the second echo cancellation signal $y_2$ accomplishes the same during the second 100 samples.

The operation of the filter units 13 and 14 is controlled by the respective filter (coefficient) update units 15 and 16. These filter update units 15 and 16 determine the coefficients of the filter units 13 and 14 respectively using techniques which may be known per se, for example techniques based on the correlation of the far-end signal x and the first residual signal $r_1$ (filter update unit 15), and the correlation of the delayed far-end signal $x_d$ and the second residual signal $r_2$ (filter update unit 16). In accordance with the present invention, both the first echo cancellation signal $y_1$ and the second echo cancellation signal $y_2$ are fed to the post-processor 18 to further process the (second) residual signal $r_2$ so as to substantially remove any remaining echoes. The post-processor of the present invention preferably utilizes spectral subtraction to remove remaining echoes. Accordingly, the absolute value $|R_p|$ of the frequency spectrum $R_p$ of the processed residual signal $r_p$ may be calculated by:

$$|R_p| = |R_1| - \gamma_1 \epsilon \cdot |Y_1| - \gamma_2 \cdot |Y_2| \qquad (2)$$

where $|R_1|$, $|Y_1|$ and $|Y_2|$ are the absolute values (that is, magnitudes) of the frequency spectra of the (first) residual signal $r_1$, the first echo cancellation signal $y_1$ and the second echo cancellation signal $y_2$ respectively, $\gamma_1$ and $\gamma_2$ are a first and a second over-subtraction factor respectively, and $\epsilon$ is an estimate of the achieved echo return loss enhancement (ERLE) of the first adaptive filter 13. The product $\epsilon \cdot |Y_1|$ is therefore an estimate of the residual direct echo signal after the first combination unit 19. The (complex) frequency spectrum $R_p$ is determined using the absolute value $|R_p|$ and the phase of the spectrum $R_2$ calculated from the second residual value $r_2$. Using an inverse Fourier transform, the processed residual signal $r_p$ is determined from the complex spectrum $R_p$.

The ERLE factor $\epsilon$ can be estimated by the formula:

$$\varepsilon = \frac{|\overline{R_1}|}{|\overline{Z}|} \qquad (3)$$

where $|R_1|$ is the absolute value of the frequency spectrum of the (first) residual signal $r_1$, $|Z|$ is the absolute value of the frequency spectrum of the microphone signal z, and both $|R_1|$ and $|Z|$ are averaged over a (short) time period in which no near-end signal (s in FIG. 2) is present and the microphone signal accordingly consists of the echo signal only. The factor $\epsilon$ is therefore indicative of the extent to which the echo is dampened by the (first) adaptive filter: in the absence of a near-end signal, the residual signal $r_1$, and hence its spectrum $R_1$, is ideally equal to zero, and $\epsilon=0$. If the adaptive filter produces no echo cancellation signal $y_1$, the residual signal $r_1$ is equal to the microphone signal z and $\epsilon=1$. The ERLE factor $\epsilon$ may be determined by the post-processor 18, but may also be determined by a separate unit (not shown), external to the post-processor. The ERLE factor $\epsilon$ is typically approximately equal to 0.2, although other values are also found.

The over-subtraction factors $\gamma_1$ and $\gamma_2$ determine the weights of the respective spectra in the spectral subtraction of formula (2) and are typically slightly greater than or approximately equal to 1, for example 1.1, although values ranging from about 0.5 to about 2.0 may be used. It is preferred that $\gamma_2$ is greater than $\gamma_1$. The over-subtraction factors compensate for the fact that the amplitudes of the echo cancellation signals typically have some variance relative to their "ideal" values and can be too small to effectively cancel the echo signal.

It can be seen from formula (2) that the frequency spectra of both the first echo cancellation signal $y_1$ and the second echo cancellation signal $y_2$ are used by the post-processor 18. In addition, the frequency spectrum of the first residual signal $r_1$ is used in formula (2). Although FIG. 2 shows a direct connection for feeding the first residual signal $r_1$ to the post-processor 18, the post-processor may derive this signal from the signals $r_2$ and $y_2$. In that case, the said connection may be omitted, as is shown in FIG. 3.

The value $|R_p|$ is typically determined for each frequency component separately and is therefore frequency-dependent. The value $|R_p|$ may further be used to determine a gain factor G which may be defined by:

$$G = \frac{|Rp|}{|R_2|} \quad (4)$$

which gain factor G is then multiplied with the complex value $R_2$ of the residual signal $r_2$ to obtain the spectrum $R_p$ of the processed residual signal $r_p$:

$$R_p = G \cdot R_2 \quad (5)$$

The original phase of the (complex) spectrum $R_2$ is used to produce $R_p$ and, using an inverse Fourier transform, the signal $r_p$. It is noted that the gain factor G is preferably also frequency-dependent. Gain factors may advantageously be used to limit the amount of echo suppression in order to reduce signal distortion. To this end, the gain factor may be compared with a minimum gain, the gain factor having a maximum value equal to one.

It is further noted that the post-processor 18 preferably processes the signals z, $y_1$, $y_2$, . . . per frame or block (B), each block being subjected to a fast Fourier transform (FFT) to obtain the complex frequency spectrum. This complex spectrum is separated into a magnitude (absolute value) and a phase using well-known techniques.

By using two distinct echo cancellation signals ($y_1$ and $y_2$) in the post-processor, a much improved post-processing is achieved which results in a virtually complete echo cancellation without distorting the near-end signal.

Instead of using the first residual signal $r_1$ as in formula (2), the post-processor may utilize the microphone signal z to determine the processed residual signal $r_p$ using the formula:

$$|R_p| = |Z| - \gamma_1 \cdot |Y_1| - \gamma_2 \cdot |Y_2| \quad (6)$$

where $|Z|$ is the absolute value of the spectrum Z of the microphone signal z. This is schematically illustrated in FIG. 3, where the connection feeding $r_1$ to the post-processor has been omitted. As in the embodiment of FIG. 2, the value $|R_p|$ may be used to calculate a gain factor G, as in formula (4). It is noted that formula (6) does not require the ERLE factor $\epsilon$.

The exemplary device 1 of FIG. 4 contains the same components as the device 1 of FIG. 3. In addition, a tail estimation unit 22 is coupled to the post-processor 18. This tail estimation unit 22 provides an estimate of the "tail" of the signal, that is, the part of the signal that cannot be echo-compensated by the first and the second filters due to the limited filter lengths.

Referring to FIG. 9, it was mentioned above that the first filter preferably has a length corresponding to T (in the example given: 100 samples), while the second filter and the delay have similar lengths. In the example discussed above, this means that the echo in only the first 200 samples of the impulse response is compensated by the filters (the echo compensation amounts to approximately −30 dB, as indicated by FIG. 10). The tail estimation unit 22 cancels echo components in the remainder of the signal (that is, from 200 samples) by estimating this "tail". The (absolute value of the) frequency spectrum of the output (processed residual) signal $r_p$ may now be determined by:

$$|R_p| = |Z| - \gamma_1 \cdot |Y_1| - \gamma_2 \cdot |Y_2| - \gamma_3 \cdot |Y_3| \quad (7)$$

where $\gamma_3$ is the over-subtraction factor of the absolute value $|Y_3|$ of the tail spectrum $Y_3$. As is the case with $\gamma_1$ and $\gamma_2$, the over-subtraction factor $\gamma_3$ is slightly greater than or approximately equal to 1, and $\gamma_3 > \gamma_2 > \gamma_1$. As can be seen, formula (7) is largely identical to formula (6), with the exception of an added tail term involving the tail estimation. The tail spectrum $Y_3$ may be estimated as follows:

$$|Y_3| = \alpha \cdot |Y_3|_{-1} + |Y_{2B}|_{-1} \quad (8)$$

where the subscript "−1" indicates a previous block or frame, and where $\alpha$ is a factor related to the reverberation time (often referred to as "T60 time" by those skilled in the art) of the room in which the device is located, $\alpha$ typically being smaller than one. In addition, $Y_{2B}$ is the spectrum of the signal obtained by convolving the last B coefficients of the second filter 14 with the delayed far-end signal $x_d$:

$$y_{2B} = \sum_{l=l0}^{l1} h_2(l) \cdot x_d(n-l) \quad (9)$$

where $l0 = N_2 - B$, $l1 = N_2 - 1$, the block size B is a number approximately equal to 80, and $h_2(l)$ are the coefficients of the second filter 14. This will later be explained in more detail with reference to FIGS. 6 and 7.

It is noted that the tail estimation unit 22 of FIG. 4 may also be added to the embodiments of FIGS. 2 and 5.

The embodiment of FIG. 5 comprises a single adaptive filter 13' and an associated filter update unit 15. The adaptive filter 13' of FIG. 5 produces an echo cancellation signal y that consists of a combination of the echo cancellation signals $y_1$ and $y_2$ of FIGS. 2-4: the first part of the echo cancellation signal y consists of $y_1$ while the second part is identical to $y_2$. Typically but not necessarily, the two parts have equal lengths, in which case the first echo cancellation signal $y_1$ constitutes the first half of the composite echo cancellation signal y, while the second echo cancellation signal $y_2$ forms its second half. The residual signal r, the first echo cancellation signal $y_1$ and the second echo cancellation signal $y_2$ are fed to the post-processor 18 to produce a processed residual signal $r_p$. In the embodiment shown in FIG. 5, the microphone signal z is also fed to the post-processor 18. The processing of these signals may be carried out in accordance with the formulae given above.

The structure of the filter 13' of FIG. 5 will be explained with reference to FIGS. 6 and 7. FIG. 6 schematically shows digital filter sections 13 and 14 and a delay unit 21 in accordance with FIGS. 2-4. The first filter section 13 comprises a number of filter cells $40_0$-$40_1$, each coupled to an associated filter coefficient unit $41_0$-$41_1$. The filter coefficients of these units $40_i$ (i=0 . . . 1) are determined by the filter update unit 15. The first filter cell $40_0$ receives samples of the far-end signal x, which are shifted through the subsequent cells (to the right in FIGS. 6 and 7). The sample value of each filter cell $40_i$ is multiplied by the filter coefficient of the respective coefficient unit $41_i$ so as to produce a weighted sample value. Summation unit 42 sums all weighted values of the filter 13 to produce the first echo cancellation signal $y_1$. It is noted that the repeated addition of the weighted sample values amounts to a convolution of the signal x and the filter coefficients.

Similarly, the filter section 14 has a number of filter cells $40_{l+1}$-$40_m$ and associated filter coefficient units $41_{l+1}$-$41_m$ which produce weighted sample values that are summed by a summation unit 43 to produce a second echo cancellation signal $y_2$. These echo cancellation signals $y_1$ and $y_2$ may be added in an adder 44 to produce a combined echo cancellation signal y.

The length of a data block B is typically less than or equal to the length of a filter section so as to allow an entire block of samples to be filtered simultaneously. The block length B is used in formula (9) above. It can be seen that the signal $y_{2B}$ is equal to the signal $y_2$ if the filter length is equal to the block length B. If the block length B is smaller than the filter length, a separate summation unit 43' (not shown) may be used to produce the signal $y_{2B}$ of formula (9).

The second filter section 14 receives delayed signal samples from the delay unit 21. It is preferred that the delay imposed by delay unit 21 is approximately equal to the delay caused by the filter units $40_i$ of the first filter section 13 so that the filter sections 13 and 14 process contiguous sets of samples.

The combined filter unit 13' of FIG. 7 also comprises a first filter section 13 and a second filter section 14. However, these filter sections are not separate but are concatenated: samples are shifted from the last filter cell $40_l$ of the first filter section 13 into the first filter cell $40_{l+1}$ of the second filter section 14. Each filter section has a dedicated summation unit 42, 43 for producing a respective echo cancellation signal $y_1$, $y_2$. An adder 44 combines these individual echo cancellation signals into a combined echo cancellation signal y.

It is noted that no delay unit 21 is required in the embodiment of FIG. 7. Instead, the first filter section 13 provides a suitable delay for the second filter section 14. This delay corresponds exactly with the filter length of the first filter section 13.

The echo cancellation device of the present invention may be incorporated into various other devices, for example consumer devices such as mobile (cellular) telephone apparatus. An exemplary telephone apparatus 80 incorporating the echo cancellation device of the present invention is shown in FIG. 8. The telephone apparatus 80 benefits from improved echo cancellation and reduced signal distortion, in particular in "hands-free" mode.

The preferred embodiment of the present invention may be summarized as an echo cancellation device for canceling any echo in a microphone signal, the device comprising:
  a first adaptive filter for producing a first echo cancellation signal,
  a first combination device for combining the first echo cancellation signal and the microphone signal so as to produce a first residual signal,
  a second adaptive filter for producing a second echo cancellation signal,
  a second combination device for combining the first residual signal and the echo second cancellation signal so as to produce a second residual signal, and
  a post-processor for suppressing any remaining echo in the second residual signal,
wherein the first adaptive filter and the second adaptive filter are designed for canceling a first part of the echo impulse response and a second part of the echo impulse response respectively.

As mentioned above, it has been shown that the two adaptive filters may be replaced with a single adaptive filter having two concatenated sections, each section producing an individual echo cancellation signal, to obtain the same benefits.

The present invention is based upon the insight that an echo cancellation device may advantageously comprise two filters which each operate on a different part of the acoustic impulse response and each produce an individual echo cancellation signal. The present invention benefits from the further insight that two or more individual echo cancellation signals may advantageously be used by a post-processor to remove any remaining echoes from the residual signal.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. An echo cancellation device for canceling an echo in a microphone signal in response to a far-end signal, the device comprising:
  a first section including a first adaptive filter for receiving the far-end signal to produce a first echo cancellation signal for a first part of an impulse response only from t=0 to t=T corresponding with a direct part of the impulse response, and a first combination unit for receiving the first echo cancellation signal and the microphone signal to produce a first residual signal;
  a second section including a second adaptive filter for receiving a delayed far-end signal to produce a second echo cancellation signal for a second part of the impulse response only from t=T corresponding with a diffuse part of the impulse response such that the second part of the impulse response is a different part than the first part of the impulse response, and a second combination unit for receiving the second echo cancellation signal and the first residual signal to produce a second residual signal;
  a delay unit for providing a delay of the far-end signal, the delay causes the first echo cancellation signal to substantially cancel the impulse response during a first plurality of samples of the signal taken during t=0 to t=T and the second echo cancellation signal to substantially cancel the impulse response during the second plurality of samples of the signal taken after t=T; and
  a post-processor for receiving the first and second echo cancellation signals, the second residual signal, and the microphone signal to produce a processed residual signal as a weighted spectral subtraction of the first and second echo cancellation signals substantially excluding any remaining echoes.

2. The device according to claim 1, wherein the post-processor directly receives the microphone signal.

3. The device according to claim 1, further comprising: at least one filter update unit included in each of the first and second sections.

4. The device according to claim 1, wherein the delay substantially corresponding to a filter length of the first adaptive filter.

5. The device according to claim 1, further comprising a tail estimation unit for estimating an echo tail of the microphone signal and providing the estimated echo tail to the post-processor.

6. The device according to claim 1, wherein a combined echo cancellation signal is a combination of the first and the second echo cancellation signals.

7. The device according to claim 1, wherein the spectral subtraction involves over-subtraction factors.

8. The device according to claim 1, included in an audio system.

9. The device according to claim 1, included in a mobile telephone device.

10. The device according to claim 1, wherein the first and second plurality of samples are contiguous sets of samples.

11. The device according to claim 1, wherein during the first plurality of samples, the energy decay curve of the impulse response includes a spike increase and the first plurality of samples ends when the energy decay curves begins a substantially linear decay.

12. The device according to claim 1, wherein during the second plurality of samples, the energy decay curve of the impulse response is substantially linearly decaying.

13. A method of canceling an echo in a microphone signal in response to a far-end signal, the method comprising acts of:
   filtering the far-end signal to produce a first echo cancellation signal for a first part of an impulse response only from t=0 to t=T corresponding with a direct part of an impulse response;
   filtering a delayed far-end signal to produce a second echo cancellation signal for a second part of the impulse response only from t=T corresponding with a diffuse part of the impulse response such that the second part of the impulse response is a different part than the first part of the impulse response;
   combining the first echo cancellation signal with the microphone signal to produce a first residual signal, and second echo cancellation signal with the first residual signal to produce a second residual signal;
   providing a delay of the far-end signal, the delay causes the first echo cancellation signal to substantially cancel the impulse response during a first plurality of samples of the signal taken during t=0 to t=T and the second echo cancellation signal to substantially cancel the impulse response during the second plurality of samples of the signal taken after t=T; and
   processing the first and second echo cancellation signals, the second residual signal, and the microphone signal to produce a processed residual signal as a weighted spectral subtraction of the first and second echo cancellation signals substantially excluding any remaining echoes.

14. The method according to claim 13, wherein the processing involves spectral subtraction.

15. The method according to claim 13, further comprising an act of estimating a tail of the microphone signal, wherein the processing involves utilizing the estimated signal tail.

16. The method according to claim 13, embodied on a computer readable non-transitory medium.

17. The method according to claim 13, wherein the act of processing comprises an act of processing the first and second plurality of samples as contiguous sets of samples.

18. The method according to claim 13, wherein during the first plurality of samples, the energy decay curve of the impulse response includes a spike increase and the first plurality of samples ends when the energy decay curves begins a substantially linear decay.

19. The method according to claim 13, wherein during the second plurality of samples, the energy decay curve of the impulse response is substantially linearly decaying.

* * * * *